US009154322B2

(12) United States Patent
Naidu et al.

(10) Patent No.: US 9,154,322 B2
(45) Date of Patent: *Oct. 6, 2015

(54) METHOD AND APPARATUS USING AN INTEGRATED FEMTOCELL AND RESIDENTIAL GATEWAY DEVICE

(75) Inventors: Lakshminarashimhan Naidu, Pearland, TX (US); Thomas P. Benzaia, Sugarland, TX (US); Bernard Ku, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 451 days.

This patent is subject to a terminal disclaimer.

(21) Appl. No.: 13/195,491

(22) Filed: Aug. 1, 2011

(65) Prior Publication Data

US 2013/0033562 A1    Feb. 7, 2013

(51) Int. Cl.
| | | |
|---|---|---|
| H04N 7/14 | (2006.01) | |
| H04L 12/28 | (2006.01) | |
| H04W 60/00 | (2009.01) | |
| H04L 29/06 | (2006.01) | |
| H04W 84/04 | (2009.01) | |
| H04N 21/4788 | (2011.01) | |

(52) U.S. Cl.
CPC ........ *H04L 12/2809* (2013.01); *H04L 12/2834* (2013.01); *H04L 65/1036* (2013.01); *H04L 65/1073* (2013.01); *H04N 7/141* (2013.01); *H04W 60/00* (2013.01); *H04L 2012/2841* (2013.01); *H04N 21/4788* (2013.01); *H04W 84/045* (2013.01)

(58) Field of Classification Search
USPC .......................................... 348/14.01–14.09
See application file for complete search history.

(56) References Cited

U.S. PATENT DOCUMENTS

| | | | | |
|---|---|---|---|---|
| 2007/0291736 | A1* | 12/2007 | Furlong et al. ................ | 370/352 |
| 2008/0057960 | A1* | 3/2008 | Lahtiranta et al. ......... | 455/435.2 |
| 2008/0309753 | A1* | 12/2008 | Karnalkar et al. ......... | 348/14.11 |
| 2009/0100492 | A1 | 4/2009 | Hicks, III | |
| 2010/0041365 | A1 | 2/2010 | Lott | |
| 2010/0144341 | A1 | 6/2010 | Robbins | |

(Continued)

OTHER PUBLICATIONS

Alcatel-Lucent, , "Integrated Femtocell Gateway Reference Design Positions Alcatel-Lucent and Broadcom a heart of the Residential Broadband Resolution", Femto World Forum; London Jun. 22, 2011; 1 page report; http://www.alcatel-lucent.com/wps/portal/!ut/p/kcxml/04_Sj9SPykssy0xPLMnMz0vM0Y . . . , Web site last visited Jul. 19, 2011.

Speed Guide, Inc., "Broadband Hardware—Technicolor / Thomson TG870 VoIP Gateway", 3 pages; http://www.speedguide.net/routers/technicolor-thomson-tg870-wireless-voip-adsl2-gatewa . . . , Website last visited Jul. 19, 2011.

(Continued)

*Primary Examiner* — Maria El-Zoobi
(74) *Attorney, Agent, or Firm* — Guntin & Gust, PLC; Joseph P. Hrutka

(57) ABSTRACT

A system that incorporates teachings of the present disclosure may include, for example, a method at a residential gateway device that registers at least one mobile phone number with the residential gateway device via a femtocell integrated with the residential gateway device when a mobile device associated with the at least one mobile phone number is within range of the femtocell, registers at least one voice over internet protocol phone number with the residential gateway device, and selectively receives and makes calls using one of a set top box registered with the residential gateway device, the mobile device registered with the femtocell, a voice over internet protocol phone corresponding to the at least one voice over internet protocol phone number. Other embodiments are disclosed.

19 Claims, 8 Drawing Sheets

(56) References Cited

U.S. PATENT DOCUMENTS

| | | |
|---|---|---|
| 2010/0184405 A1 | 7/2010 | Chen |
| 2010/0184411 A1 | 7/2010 | Chen |
| 2010/0189084 A1 | 7/2010 | Chen |
| 2010/0210239 A1 | 8/2010 | Karaoguz |
| 2011/0066875 A1 | 3/2011 | Fan |
| 2011/0202956 A1* | 8/2011 | Connelly et al. .............. 725/38 |

OTHER PUBLICATIONS

Thomson, Inc., , "Thomson TG870—Residential Gateway with Integrated 3G Femtocell", 4-page paper with Technical Specifications; 2009.

Youtube, "Thomson's Integrated Femtocell Gateway TG870", 2 pages; http://www.youtube.com/watch?v=ijL0qv15zEQ.

* cited by examiner

100

600

700

US 9,154,322 B2

METHOD AND APPARATUS USING AN INTEGRATED FEMTOCELL AND RESIDENTIAL GATEWAY DEVICE

RELATED APPLICATION

U.S. patent application Ser. No. 12/898,186, filed Oct. 5, 2010, by Benzaia et al., entitled "INTERNET PROTOCOL TELEVISION AUDIO AND VIDEO CALLING" and U.S. patent application Ser. No. 12/898,214, filed Oct. 5, 2010, by Naidu et al., entitled "AUDIO AND VIDEO CALLING THROUGH MULTIPLE TERMINAL DEVICES." All sections of the aforementioned applications are incorporated herein by reference.

FIELD OF THE DISCLOSURE

The present disclosure relates generally to communication and more specifically to a method and apparatus using an integrated femtocell and residential gateway device.

BACKGROUND

Existing IPTV systems have Voice over IP or VoIP and video conferencing capabilities using computer equipment and specialized VoIP telephones. These functions are not integrated elegantly with a number of other functions associated with IPTV network services such as video presentations. Subscribers receiving calls during the presentation of a media program may be inconvenienced and miss part of the presentation in their attempts to answer a call or even to make a call using the IPTV calling features. Generally, existing subscribers are making and answer phone calls using existing corded or cordless phones that may be coupled via an RJ11 jack to a Terminal Adapter located inside a Residential Gateway.

Femtocells allow a broadband network subscriber to essentially create their own cellular coverage area which can relieve wireless traffic demands on surrounding cellular coverage areas or cellular base stations. Provisioning a femtocell on to a broadband network is generally deployed to improve indoor wireless coverage provided by a wireless network operator. Cellular phone calls received can also cause an IPTV network subscriber to be inconvenienced by missing part of a video presentation at a set top box when answering the cellular call. Furthermore, subscribers typically do not know that femtocells are available or that they even exist.

DETAILED DESCRIPTION

The present disclosure describes, among other things, illustrative embodiments of audio and video calling using an integrated femtocell and gateway device. Other embodiments are contemplated by the present disclosure.

One embodiment of the present disclosure includes a set top box having a processor adapted to register at least one cellular phone number with a residential gateway associated with the set top box via an integrated femtocell and residential gateway device when a cellular phone associated with the at least one cellular phone number is within range of a femtocell of the integrated femtocell and residential gateway device. The processor is further adapted to register at least one voice over internet protocol phone number with the residential gateway and generate a display of a user interface providing an option to use the at least one cellular phone number or the at least one voice over internet protocol phone number when initiating a phone call and when answering a phone call.

One embodiment of the present disclosure includes a tangible computer-readable storage medium at an integrated femtocell and residential gateway device that includes computer instructions to communicate with a set top box associated with the integrated femtocell and residential gateway device, register a mobile phone number with the integrated femtocell and residential gateway device via a femtocell of the integrated femtocell and residential gateway device when a mobile device associated with the mobile phone number is within range of the femtocell, and register at least one voice over internet protocol phone number with a residential gateway of the integrated femtocell and residential gateway device. The computer instructions can also selectively enable calls using one of the set top box and the mobile device.

One embodiment of the present disclosure includes a method at an integrated femtocell and residential gateway device for registering at least one mobile phone number with the integrated femtocell and residential gateway device via a femtocell of the integrated femtocell and residential gateway device when a mobile device associated with the at least one mobile phone number is within range of the femtocell and for registering at least one voice over internet protocol phone number with a residential gateway of the integrated femtocell and residential gateway device. The method can also selectively receive and make calls using one of a set top box registered with the residential gateway and the mobile device.

Figure 1:
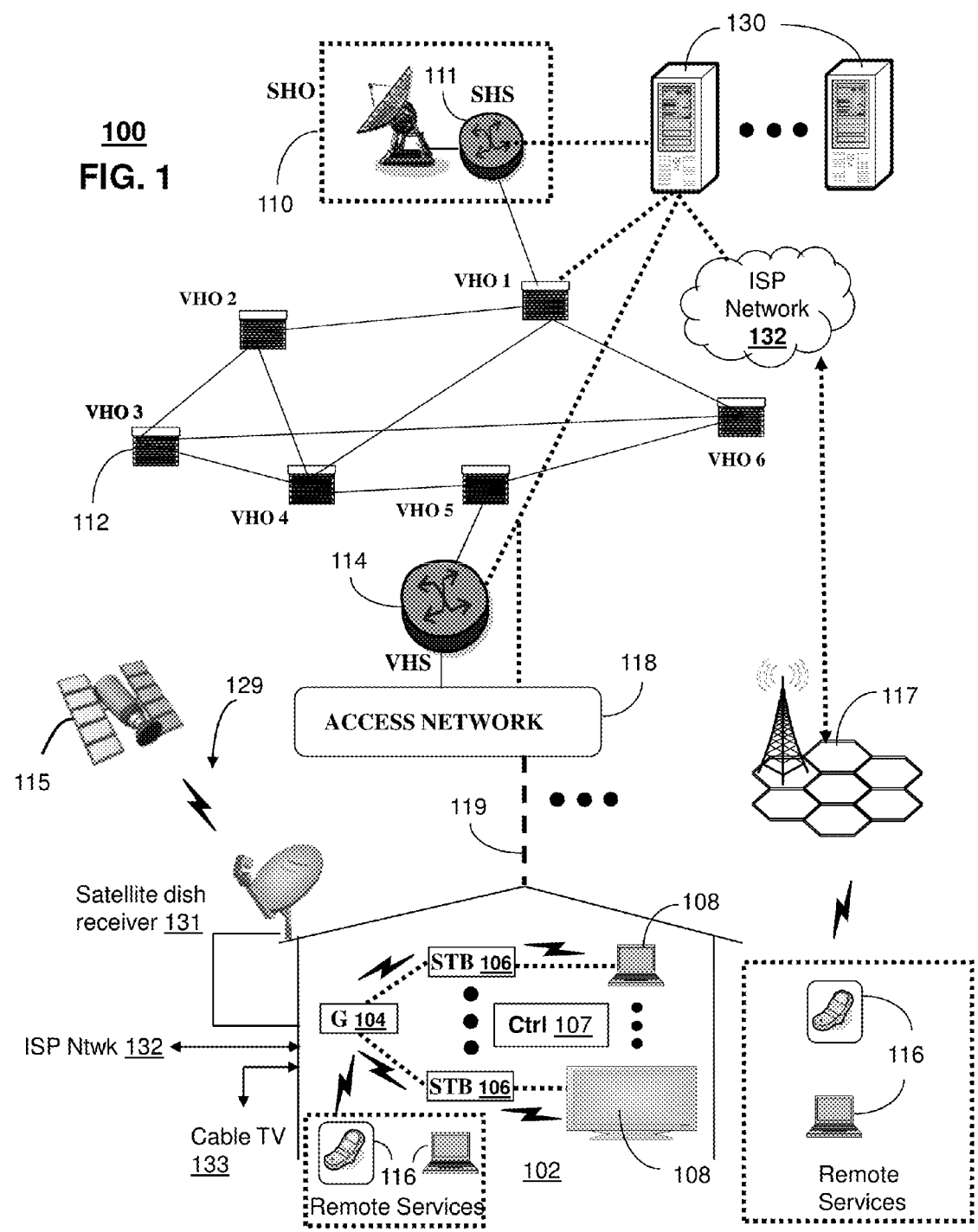
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). The gateway 104 as will be discussed in further detail below can include an integrated femtocell enabling communication with remote devices 116 when in range of the femtocell.

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on or via a femtocell in the integrated femtocell and gateway device 104 when a portable communication device 116 is within range of the femtocell. Other present and next generation wide area wireless network technologies are contemplated by the present disclosure.

Figure 8:
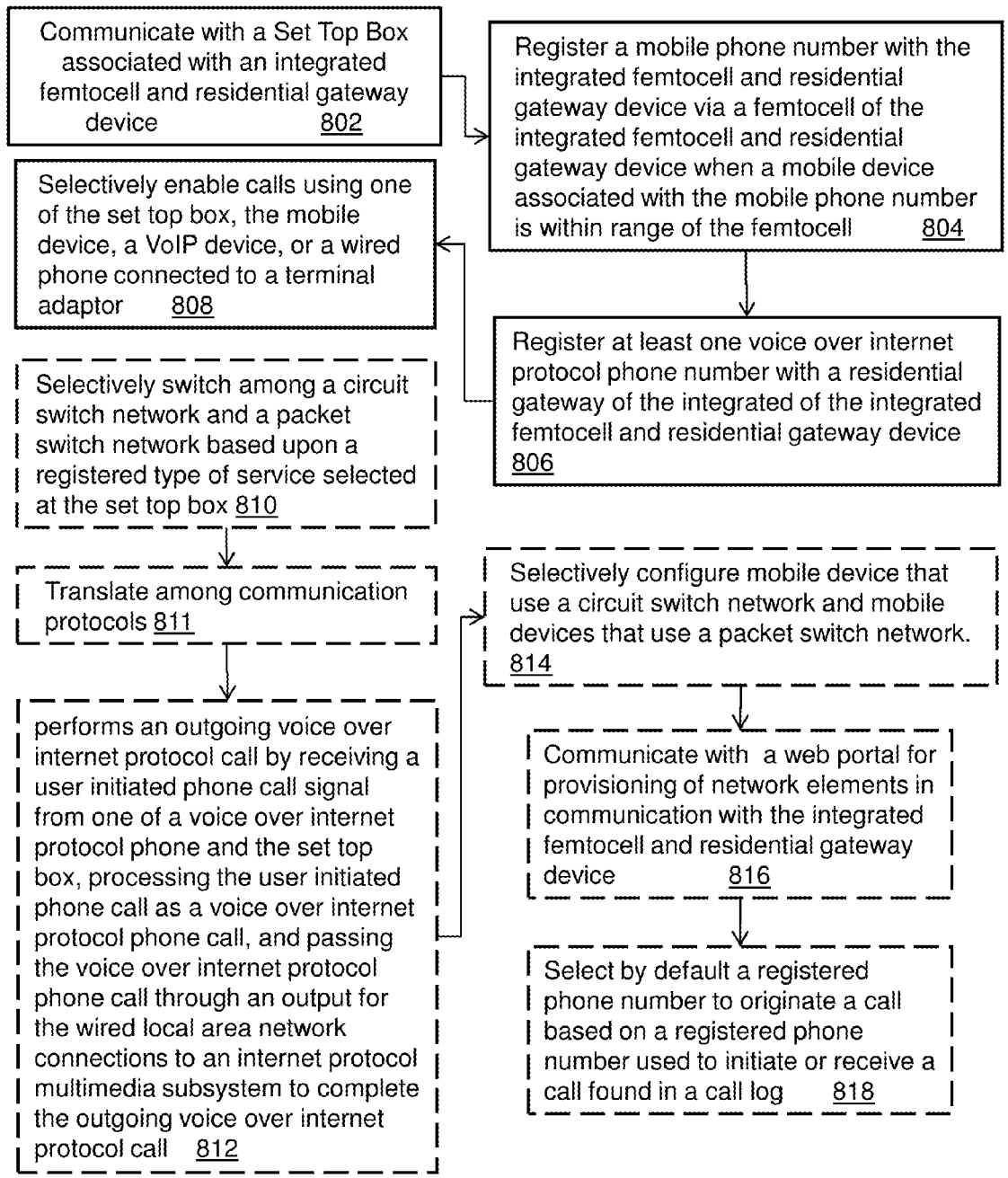
FIG. 8 depicts an illustrative embodiment of a method operating in portions of the systems described in FIGS. 1-7.

Illustrative embodiments of method 800 shown in FIG. 8 can be applied to portions of the devices of FIG. 1.

Figure 2:
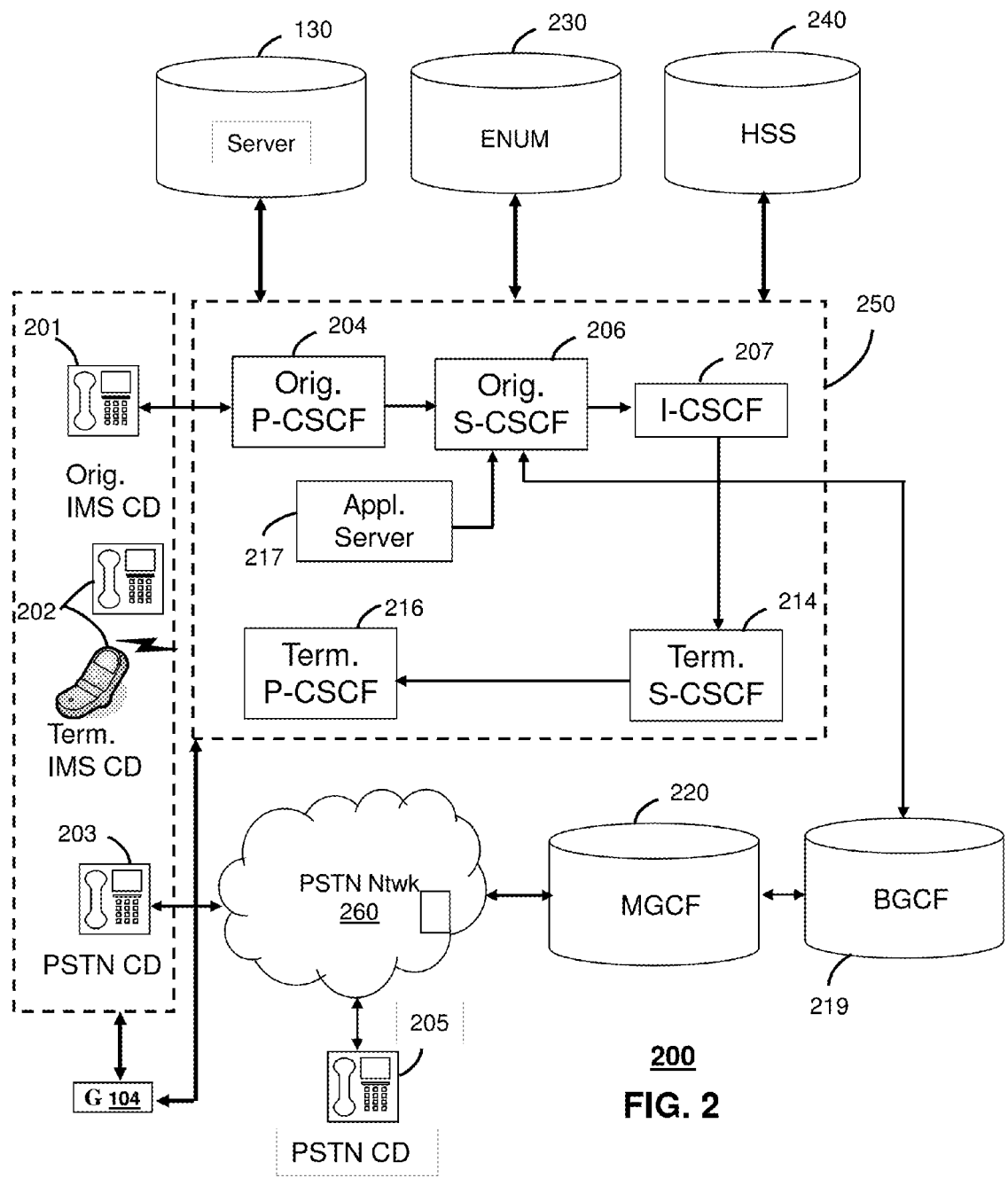

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100. FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201 and 202 with the multimedia and Internet services of communication system 100.

Illustrative embodiments of methods that can operate in portions of the devices of FIG. 2 are described below.

Figure 3:
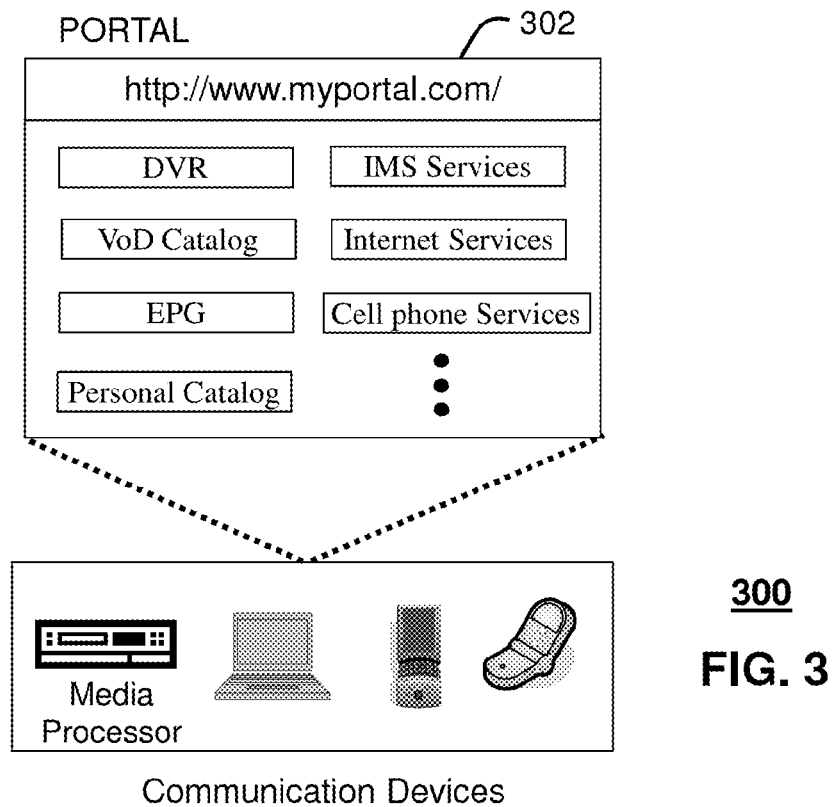
FIG. 3 depicts an illustrative embodiment of a web portal for interacting with the communication systems of FIGS. 1-2.

FIG. 3 depicts an illustrative embodiment of a portal 302 which can operate from the computing devices 130 of the communication system 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 302 can also be used for provisioning IMS services described earlier, provisioning Internet services, provisioning cellular phone services, provisioning an integrated femtocell and residential gateway device as further described below, and so on.

Illustrative embodiments of methods that can operate in portions of the portal 302 of FIG. 3 are described below.

Figure 4:
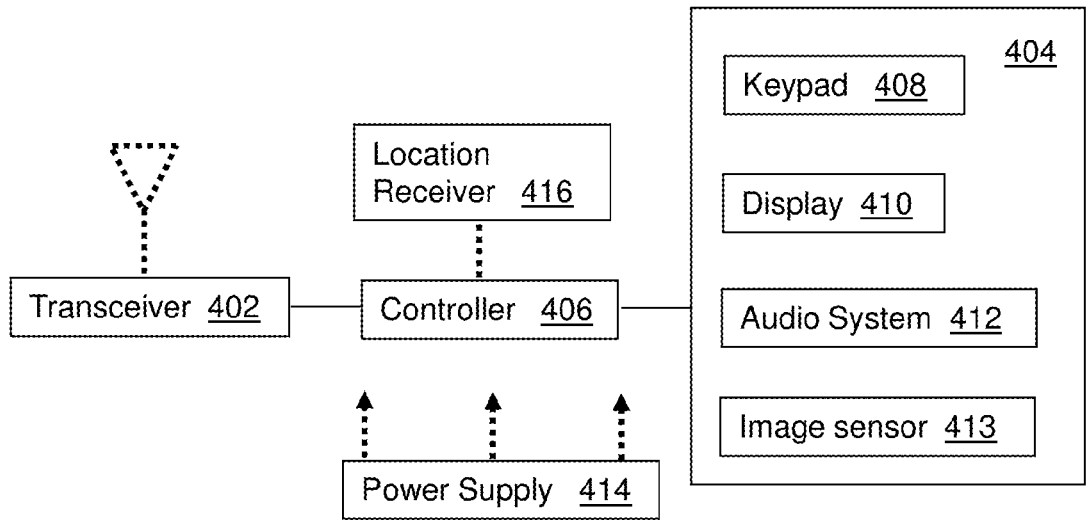
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
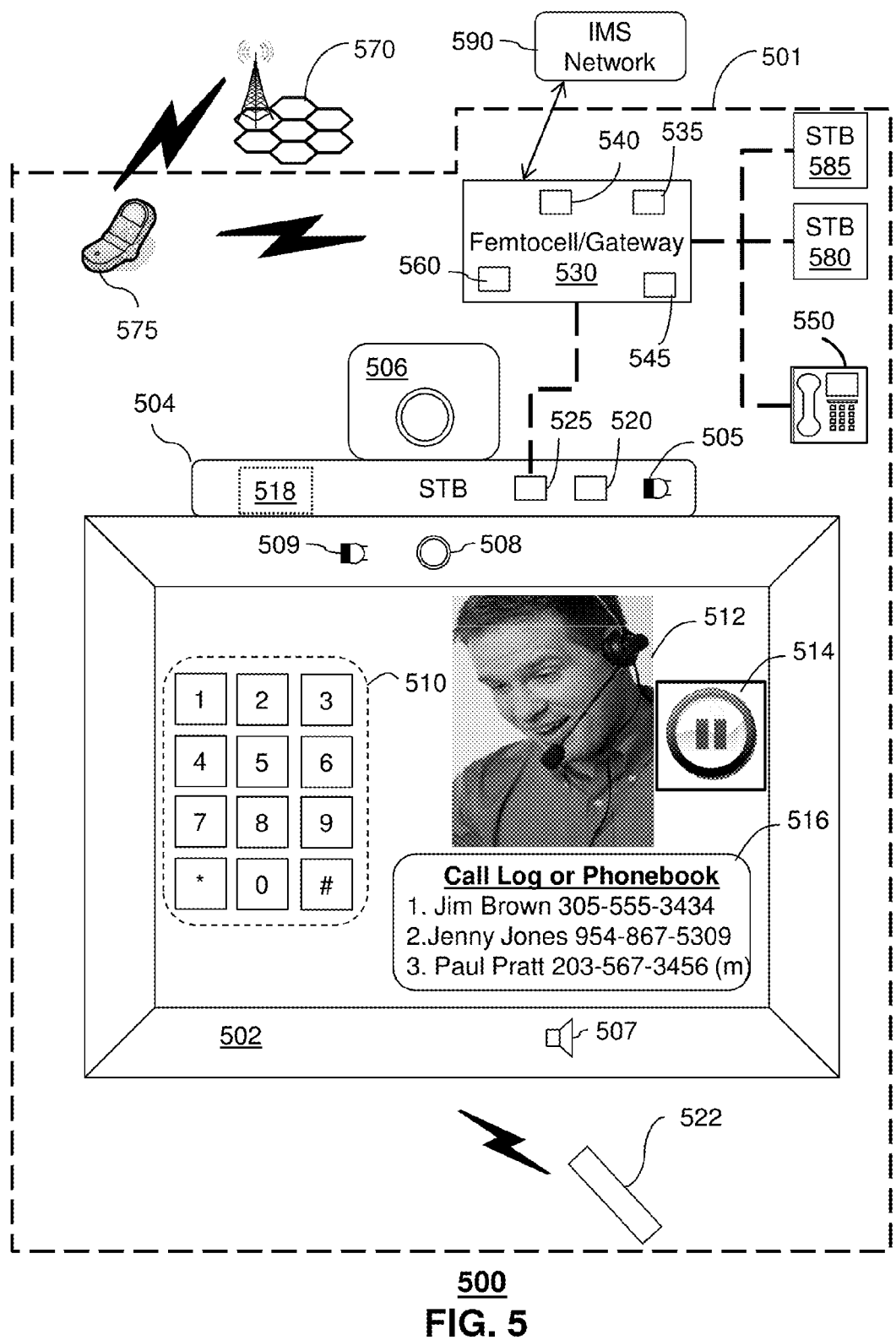
FIG. 5 depicts an illustrative embodiment of a system.

FIG. 5 depicts a system 500 within a premise 501 for use in an IPTV network 100 (such as shown in FIG. 1) or an IMS network 590 in accordance with the claimed embodiments. The system 500 can include an STB 504 having a controller 520 operable to, among other things, execute a soft-phone client application on the STB 504, receive audio calls or video calls at the STB 504 using the soft-phone client application, detect and present a Caller ID associated with an audio call or a video call, and to selectively answer the audio call or the video call. The controller 520 can also be operable to receive the audio call or video call routed from an integrated femtocell and gateway device 530 (such as a Residential Gateway (RG) having an integrated femtocell) communicatively coupled to the IPTV network 100 or IMS network 590 when the audio call or video call is selectively answered and present the audio call or video call through a presentation device 502 coupled to the STB 504. The integrated femtocell and gateway device 530 can include a switching element capable of directing calls to a select communication device in a premise according to a destination address in, for example, a SIP message received by the integrated femtocell and gateway device 530. The switching element 545 can be implemented in software, hardware, or a combination thereof.

A video call can be presented for example in a viewing area 512 of the presentation device 502. The STB 504 can further include a terminal adaptor 525 that is integrated within the STB 504. The terminal adapter 525 can serve the function of converting VoIP signals to Plain Old Telephone Service (POTS) signals commonly used by non-VoIP-capable phones. The gateway device 530 which can operate in a residence or commercial establishment and can couple to the STB's internal terminal adaptor 525 since the gateway 530 communicates with the STB 504 and the STB 504 communicates with its internal terminal adaptor 525. The gateway can also include its own processor or controller 540 and its own terminal adaptor 535 for coupling to analog telephone sets. The gateway 530 can also connect to a VoIP phone 550, one or more secondary STBs 504, 580 or 585 or a mobile cellular phone 575 via a femtocell 560 of the integrated femtocell and gateway 530 for enabling communications as shown when the mobile cellular phone 575 is within range of the femtocell 560.

The femtocell 560 within the integrated femtocell and gateway device 530 can be used to enable the mobile cellular phone 575 to receive and initiate calls when cellular coverage is poor in the vicinity of premise 501. The mobile phone 575 can also communicate via a wireless base station 570 outside of the premise 501 when cellular coverage is available. Note that the gateway device 530 can couple to any number of terminal devices such as additional STBs, computers, and traditional POTs phone devices. STBs 504, 580 and 585 as well as VoIP phone 550 and mobile phone 575 are shown as examples of such terminal devices. The gateway device 530 can also be coupled to an IPTV or IMS network outside the premise as well. Depending on whether the terminal device is VoIP-capable, a terminal device may or may not be necessary.

The presentation device 502 can be a television having a speaker 507 that enables an audio call or an audio portion of a video call to be presented through the speaker 507 of the television 502. The STB 504 can include a microphone 505 or a microphone 509 operatively coupled to the STB 504 for transmitting audio input from the STB 504 to a calling party telephony device or called party receiving telephony device. The microphone 505 can be integrated within the STB 504 and the microphone 509 can be integrated within the television 502. The system 500 can also include an camera such as an IP camera 506 operatively coupled to the STB 504 for transmitting video signals or video input from the STB 504 to a calling party telephony device or called party telephony device. Alternatively or optionally, a camera 508 can be integrated as part of the television 502 and operatively coupled to the STB 504.

The STB 504 can also include a digital video recorder (DVR) 518 or have DVR functionality. The controller 520 can perform one or more of the functions among pause, record and mute of a media presentation or media program 514 for a duration of an answered call or the duration of an STB initiated call. The controller 520 can also facilitate a voice call using the STB 504 (instead of a mobile phone keypad or voice over internet protocol phone keypad) by presenting a virtual phone keypad 510 on a display of the presentation device 502 and enable selections of keys using a remote control 522 of the STB 504. The controller 520 can be directed to initiate a voice call or a video call based on a selection made from of a call log screen or an electronic phonebook 516. The controller 520 can also initiate a video call by using SIP Options messages for service discovery to determine if an endpoint calling device is available to receive the video call.

The present disclosure contemplates a STB 504 and a gateway device (530 or 104 of FIG. 1) that among other things facilitates audio and video calls via an IPTV network using soft phone client software in the STB 504 capable of optionally pausing, recording or muting an ongoing media presentation or program according to the illustrative embodiments of method 800 of FIG. 8. By combining DVR functions with the audio and video call functions, a subscriber can conveniently and unobtrusively manage phone and video calls by pausing or muting or allowing background recording of a presentation for the duration of a call.

In one embodiment, the incoming calls can be processed programmatically. For example, the controller in the STB or DVR is operable to cause the DVR to automatically pause, record or mute a media presentation responsive to answering the audio or video call based on an incoming caller identifier and the assigned affiliation of the incoming caller identifier to a preset group. For instance, if a caller identifier is on a "preferred mute" list, then the STB causes muting, or if the caller identifier belongs to a "preferred pause" list, then the STB causes its DVR subsystem to generate a pause, and if a caller identifier belongs to a "preferred record" list, then the STB subsystem causes the DVR to record the media presentation.

The soft-phone client along with the integrated femtocell and gateway device 530 increases the number of available telephone numbers and the types of devices that may be used at the STB 504 (or at other terminal devices 580, 585, 550 and 575 coupled to the gateway 530) by integrating wireless carrier services used by the mobile cellular phone 575 and multiple VoIP numbers. The embodiments herein allow users to place or receive (originate or terminate) voice and/or video telephone calls on the STB 504 using any of the wireless subscriber numbers or broadband VoIP subscriber numbers. Thus, multiple VoIP and wireless phones numbers can be registered with the gateway 530 to allow incoming and outgoing calls through the various terminal devices coupled to the gateway 530. In one example, when a call is received via a subscriber's wireless phone line and the wireless phone is within range of their femtocell, if the subscriber has configured calls to route to the STB, then the Caller ID data can be displayed on the subscriber's television set 502. The user can answer the call via their soft-phone client application in the STB 504.

When a call is received from any one of the multiple VoIP telephone numbers or station identifiers (504, 550, 580, 585, 575), the subscriber user can answer the call from the STB 504 if so desired. The subscriber can also select a telephone number to use for outgoing calls from a list of telephone numbers that are registered with the gateway 530. Thus, a call from the STB 504 can make an outgoing call using a phone number that is associated with terminal devices 504, 575, 550, 580 or 585 for example even though the outgoing call is made from STB 504.

Figure 6:
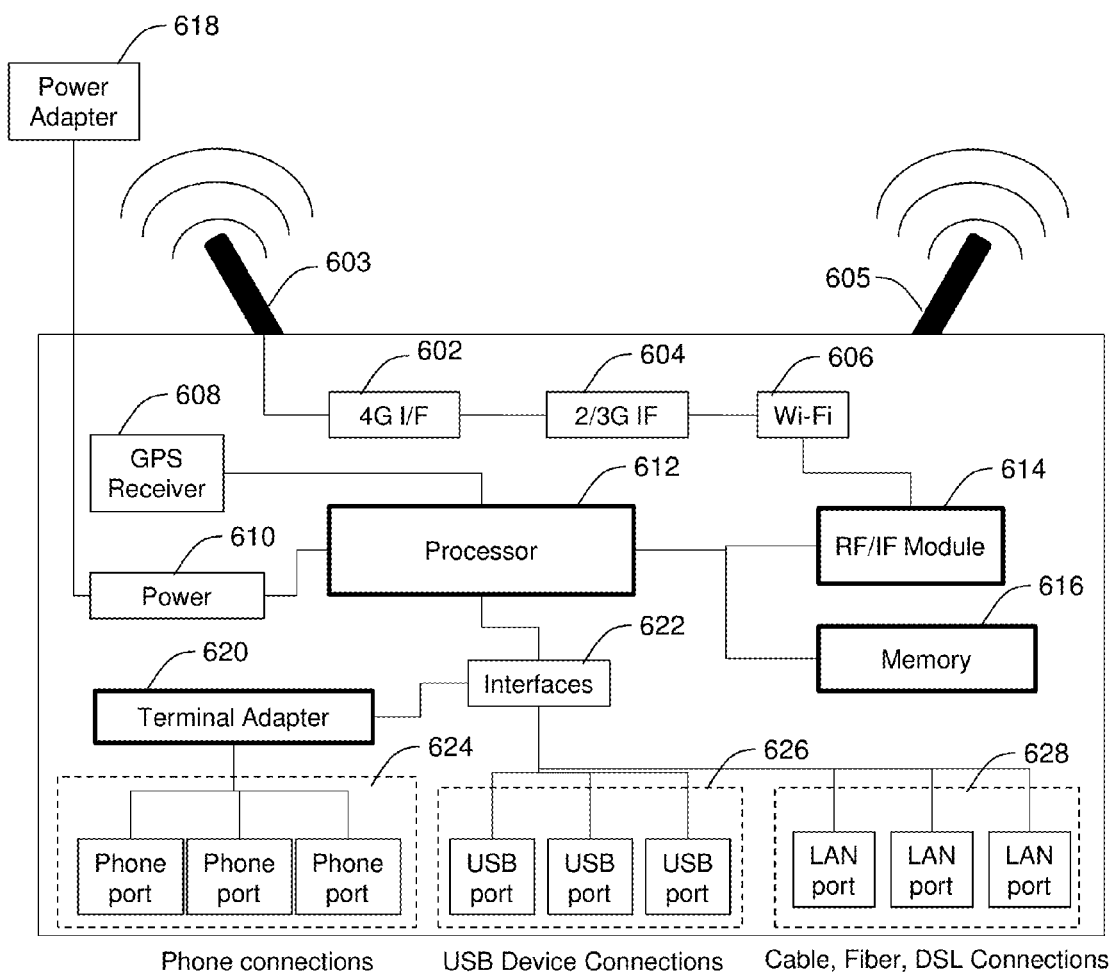
FIG. 6 depicts an illustrative embodiment of a integrated femtocell and gateway device.

Referring to FIG. 6, an integrated femtocell and gateway device 600 is illustrated similar to the device 530 of FIG. 5. The device 600 can serve as a residential gateway for all home services allowing connections for IPTV, IP Data, VoIP, 2G/3G switched mobile, 4G packet mobile and Wi-Fi devices. In one embodiment, the device 600 can integrate existing products from AT&T including U-verse, voice over internet protocol, and $2^{nd}$, $3^{rd}$, and $4^{th}$ generation (or 2G, 3G, and 4G) mobility products.

The integrated femtocell and gateway 600 can include a residential gateway with inputs for 4G (IP) signals, 2G/3G (TDM) signals, and WiFi (802.11x) signals via 4G transceiver module 602, a 2G/3G transceiver module 604, and a Wireless Fidelity transceiver module 606 respectively. An antenna 603 can be used to receive and radiate 4G, 3G, and 2G signals and an antenna 605 can be used to receive and radiate WiFi signals. The gateway 600 can be powered by an external power source such as a power adapter 618 that powers a power module 610. A processor 612 can be powered by the power module 610 and be coupled to a number of devices including a GPS receiver 608, a radio frequency or intermediate frequency module 614, a memory module 616 and an interface module 622. The integrated femtocell and gateway 600 can further include a number of outputs for wired LAN connections 628, for wired telephone connections 624 via a terminal adaptor 620, and for Wi-Fi connections and 2G/3G/4G wireless connections. The gateway can further include USB ports 626 for connecting to USB devices. The embodiments represented by gateway 600 can be easily integrated with existing IPTV/mobility deployments and can be deployed in live, existing IPTV and mobility networks. The embodiments herein can also meet a global demand for deployed IMS networks. Furthermore, the processor 612 can operate or be programmed to translate between the various communication protocols interacting with the integrated femtocell and gateway 600. In the case of a system using IP signals as in 4G cellular, Time Division Multiplex signals as in 2G and 3G cellular, 802.11x as in WiFi, VoIP signals, and analog phone lines, the processor 612 (and interfaces 622) can serve to translate among the protocols as the respective communication services are processed through the gateway 600. As other communication protocols become available or desirable to integrate within such an environment, the processor 612 can be programmed to translate such additional protocols facilitated through the gateway 600. For example, other services using WiMax, orthogonal frequency division multiplexing (OFDM) signaling, or code division multiple access (CDMA) signaling can be incorporated within the gateway 600.

Figure 7:
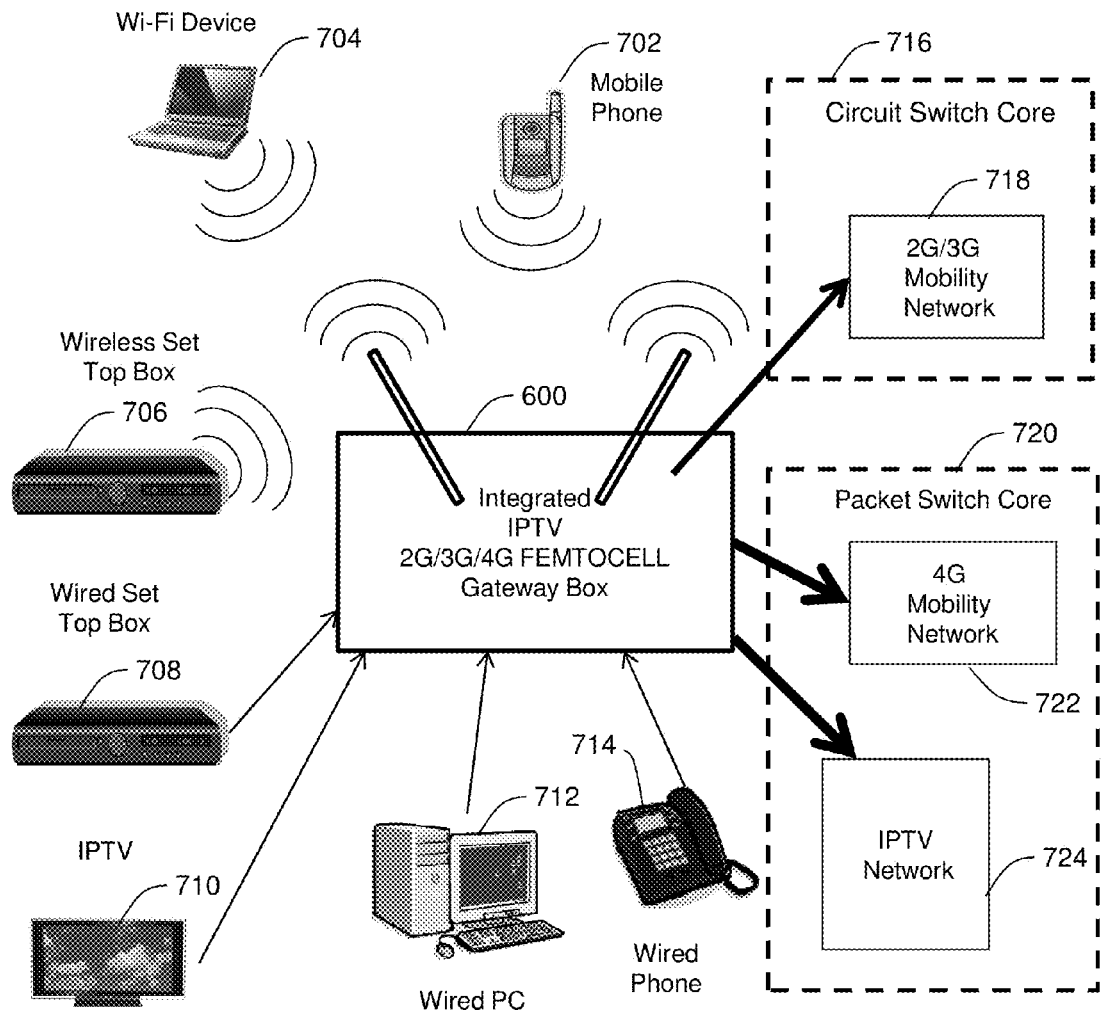
FIG. 7 depicts an illustrative embodiment of a system using the integrated femtocell and gateway device of FIG. 6.

Referring to FIG. 7, a communication system 700 including the integrated femtocell and gateway device 600 comprises a plurality of communication devices which uses the gateway device 600 including a mobile phone 702, a WiFi device 704, a wireless set top box 706, a wired set top box 708, and internet protocol television network device 710, a wired computer 712 and a wired phone 714. Depending on the type of communication service requested by the device making or receiving a call through the integrated femtocell and gateway device 600, the device 600 will selectively switch from using a circuit switch core 716 or a packet switched core 720 for communication through respective circuit switch or packet switch networks regardless of which terminal device is used. If a 2G or 3G communication service is selected to initiate or receive a call via the integrated femtocell and gateway device 600, then a 2G/3G mobility network 718 of the circuit switch core 716 is used regardless of which terminal device is used. If a 4G communication service is selected to initiate or receive a call via the device 600, then a 4G mobility network 722 of the packet switch core 720 is used regardless of which terminal device is used. If an internet protocol communication service is selected to initiate or receive a call, then the IPTV network 724 of the packet switch core 720 is used regardless of which terminal device is used. Any terminal device (702-714) can use any of the connection services (for example, 2G, 3G, 4G, VoIP, WiFi, POTS, or IPTV) as long as they are able to present via an interface since the integrated device will perform translation between respective protocols.

In a more specific example in accordance with the embodiments, an AT&T U-verse user can make a voice call in at least two ways. A first way uses a pop-up a phone keypad on the screen (as shown in FIG. 5) allowing the user to dial out. In a second way, before dialing, the user can be presented with the option to dial using any of their subscribed or registered U-verse or AT&T Mobility (3G Femtocell) numbers. The system enables access to the call logs of any U-verse or AT&T Mobility registered number and click on the name or phone number of the party to call. By default, if the user does not pick which number from which to originate the call, the registered number that was used to make or answer the call in the log is selected (mobility numbers or cellular phone numbers will only be available if currently connected to the integrated femtocell and residential gateway device). In both cases, the call can be made via the STB (voice via TV speakers and STB microphone) routed through the integrated femtocell and gateway device which already has the U-verse voice (VoIP) service and AT&T Mobility phone numbers registered. The user will have the option to record, pause or mute the current television programming.

In yet another embodiment, a user may make a video call to another U-verse or Mobility (cellular phone) user who has a video call enabled device by selecting which number to use for originating the video call. The integrated femtocell and gateway device can use SIP Options messages for service discovery to see if the other end point is also a U-verse end point or a mobility device with Video Share. That can be done using ENUM located in the IMS core. If service discovery returns "OK", then the U-verse user is allowed to make the video call via the STB and the called party will get caller ID message on his or her STB. The called party can select between the options of answering the video call, making the call an audio call only, or discarding the call when the called party selects to answer the call, if they have DVR capability the STB can pause, record or mute the TV show being watched. The concept of video call can be further extended to allow a U-verse user to make a video call not only to AT&T mobility Video Share users but to other users in the AT&T network and outside the AT&T network once they are capable of receiving video calls. For example, a video call can be made via a 4G (LTE) phone/network.

FIG. 8 depicts an illustrative method 800 that operates in portions of the devices of FIGS. 1-7. Method 800 can begin with an integrated femtocell and residential gateway communicating with a set top box associated or registered with the integrated femtocell and residential gateway device at 802. At 804, the integrated femtocell and residential gateway device can register a mobile phone number with the integrated femtocell and residential gateway device via a femtocell of the integrated femtocell and residential gateway device when a mobile device associated with the mobile phone number is within range of the femtocell. At 806, the integrated femtocell and residential gateway device can register at least one voice over internet protocol phone number with a residential gateway of the integrated femtocell and residential gateway device. The method 800 at 808 can then selectively enable calls using one among the set top box or the mobile device as well as a voice over internet protocol phone or a wired phone connected to a terminal adaptor.

The method at 810 can selectively switch among a circuit switch network and a packet switch network based upon a connection service requested by a registered device to originate or receive a call. The registered type of device can be one among a mobile phone, a wireless fidelity device, a wireless set top box, a wired set top box, a wired personal computer and a wired phone for example. The method at 811 can then perform translations among communication protocols based on the connection services requested at 810. The method at 812 performs an outgoing voice over internet protocol call by receiving a user initiated phone call signal from one of a voice over internet protocol phone, a set top box, any wireless phone registered to the femtocell, and any wired phone connected to a terminal adaptor within the integrated femtocell and residential gateway device, processing the user initiated phone call as a voice over internet protocol phone call, and passing the voice over internet protocol phone call through an output for the wired local area network connections to an internet protocol multimedia subsystem to complete the outgoing voice over internet protocol call. At 814, the method can selectively configure registerable devices among mobile devices that use the circuit switched network, mobile devices that use the packet switched network, and the set top box. Optionally, at 816 the method 800 can have the integrated femtocell and gateway device communicate with a web portal for provisioning network elements in communication with the integrated femtocell and residential gateway device. At 818, the method selects by default a registered phone number to originate a call based on a registered phone number used to initiate or receive a call found in a call log. Note that the functions described above are primarily performed by the integrated femtocell and residential gateway device, but can alternatively be performed by a set top box in some instance or by a set top box in communication with the integrated femtocell and gateway device.

Upon reviewing the aforementioned embodiments, it would be evident to an artisan with ordinary skill in the art that said embodiments can be modified, reduced, or enhanced without departing from the scope and spirit of the claims described below. For example, as noted above, some of the functions performed by the integrated femtocell and gateway device can be performed by a set top box or a set top box operating cooperatively with the gateway device. The embodiments herein include embedded phone software that can enable a processor to initiate or receive audio or video calls. In the case of video calls, the processor can be further adapted to perform one of a number of functions including pause, record, and mute of a video program for a duration of a call. Other embodiments are contemplated by the present disclosure.

Figure 9:
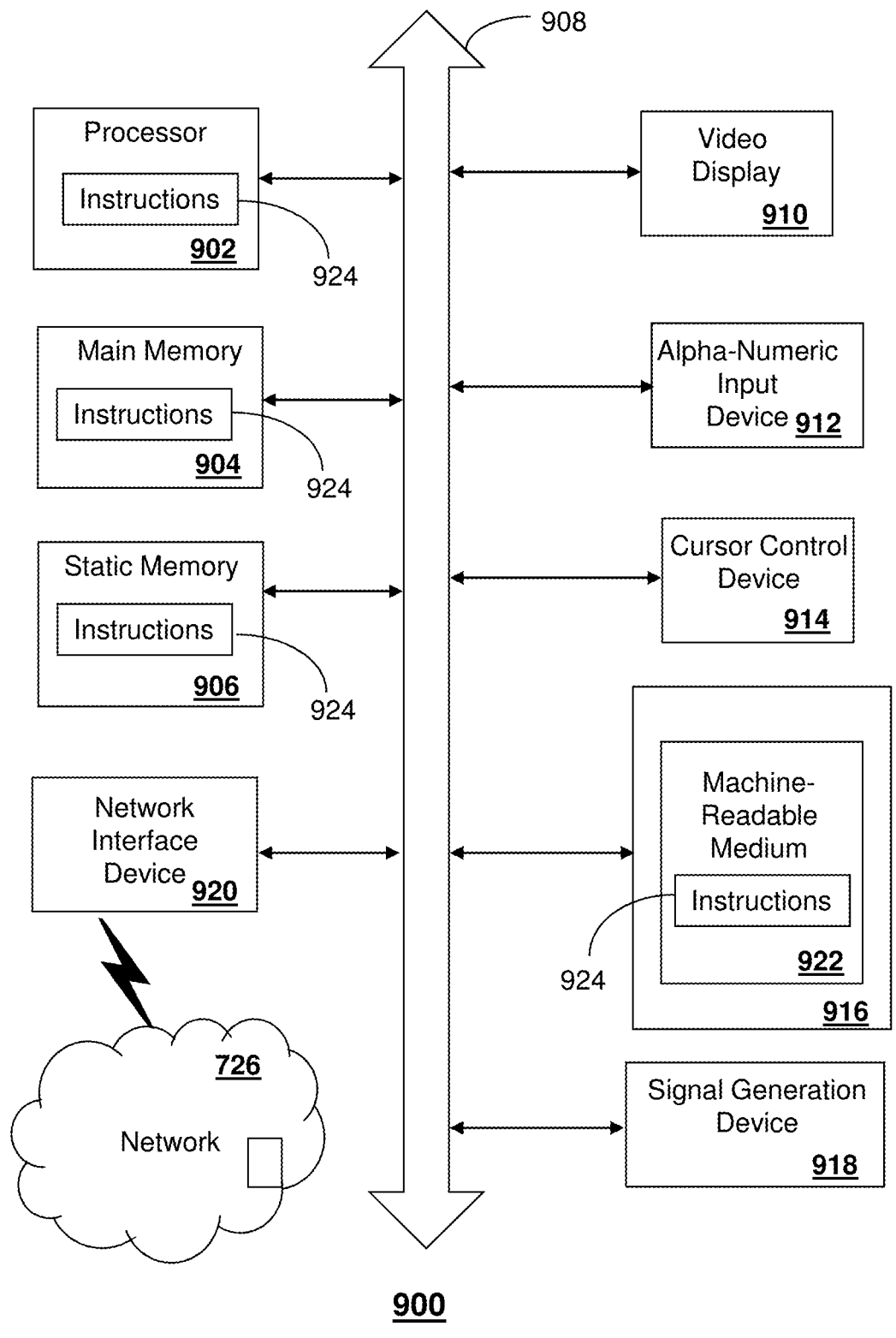
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methods discussed above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set top box, comprising:
   a memory that stores instructions;
   a digital video recording device; and
   a processor coupled to the memory and the digital video recording device, wherein responsive to executing the instructions, the processor performs operations comprising:
      registering a cellular phone number with a residential gateway device associated with the set top box, wherein the residential gateway device comprises an integrated femtocell, and wherein the registering is performed when a cellular phone associated with the cellular phone number is within range of the femtocell;
      registering a voice over internet protocol phone number with the residential gateway device;
      presenting at a display device coupled to the set top box a user interface providing an option to use a first service associated with the cellular phone number or a second service associated with the voice over internet protocol phone number when initiating an outgoing call or when answering an incoming call as presented options;
      receiving an incoming call or initiating the outgoing call associated with one of the cellular phone number or the voice over internet protocol phone number through the femtocell responsive to receiving a selection from the presented options via the set top box; and
      performing one of pause, record, mute, or a combination thereof of a video program at the digital video recorder for a duration of the outgoing call or the incoming call.

2. The set top box of claim 1, comprising a built-in microphone coupled to the processor, wherein the operations further comprise:
   selectively initiating the outgoing call through a connection service associated with a registered device associated with the femtocell; and
   responsive to the selection of the presented options, recording a presentation of media content at the display device during the incoming or outgoing call.

3. The set top box of claim 1, comprising a video camera coupled to the processor, wherein the operations further comprise initiating or receiving a video call as the outgoing call or the incoming call.

4. The set top box of claim 1, wherein the user interface includes a call log of the voice over internet protocol phone number and the cellular phone number.

5. The set top box of claim 4, wherein the operations further comprise selecting by default a registered phone number to originate a call based on the call log.

6. The set top box of claim 3, wherein the residential gateway device uses session initiation protocol option messages for service discovery to determine if another endpoint is enabled to receive the video call.

7. A non-transitory computer-readable storage medium used by a residential gateway device, comprising computer instructions, wherein responsive to executing the instructions, a processor performs operations comprising:
   communicating with a set top box through a femtocell integrated with the residential gateway device;
   registering a mobile phone number with the residential gateway device via the femtocell of the residential gateway device when a mobile device associated with the mobile phone number is within range of the femtocell;
   registering a voice over internet protocol phone number with the residential gateway device;
   presenting, at a display device coupled to the set top box, a user interface providing an option to use a first service associated with the mobile phone number or a second service associated with the voice over internet protocol phone number when initiating an outgoing call or when answering an incoming call as presented options;
   selectively enabling calls using one of the set top box or the mobile device responsive to receiving a selection from the presented options via the user interface providing the option to use the first service associated with the mobile phone number or the second service associated with the voice over internet protocol phone number through the femtocell when initiating an outgoing call or when answering an incoming call; and
   generating a pause command for a digital video recorder associated with the display device for a duration of the outgoing call or the incoming call.

8. The non-transitory computer-readable storage medium of claim 7, wherein the residential gateway device comprises inputs for internet protocol signals, cellular phone signals, and wireless fidelity signals and comprises outputs for wired local area network connections, wired telephones, wireless fidelity connections, cellular phone connections, and wireless internet protocol connections.

9. The non-transitory computer-readable storage medium of claim 7, wherein the operations further comprise selectively switching among a circuit switch network and a packet switch network based upon a registered type of service selected at the set top box.

10. The non-transitory computer-readable storage medium of claim 7, wherein the operations further comprise translating among communication protocols used by the set top box and the mobile device.

11. The non-transitory computer-readable storage medium of claim 10, wherein the operations further comprise selectively initiating a call through a connection service associated with a registered device associated with the femtocell, and wherein a type of the registered device comprises one among a mobile phone, a wireless fidelity device, a wireless set top box, a wired set top box, a wired personal computer or a wired phone.

12. The non-transitory computer-readable storage medium of claim 9, wherein the operations further comprise performing an outgoing voice over internet protocol call when receiving a user initiated phone call signal from one of a voice over internet protocol phone or the set top box by processing the user initiated phone call as a voice over internet protocol phone call, and passing the voice over internet protocol phone call through an output of a wired local area network connection to an internet protocol multimedia subsystem to complete the outgoing voice over internet protocol call.

13. The non-transitory computer-readable storage medium of claim 12, wherein the residential gateway device is configured to perform the outgoing voice over internet protocol call by receiving the user initiated phone call signal from any one of the voice over internet protocol phone, the set top box, any wireless phone registered to the femtocell, and any wired phone connected to a terminal adaptor within the residential gateway device and wherein the residential gateway device comprises computer instructions to translate among communication protocols used by the set top box, the mobile device, the voice over internet protocol phone, any wireless phone registered to the femtocell, and any wired phone connected to a terminal adaptor within the residential gateway device.

14. The non-transitory computer-readable storage medium of claim 8, wherein the residential gateway device comprises a radio frequency module for receiving and transmitting cellular phone signals, wireless internet protocol signals, and wireless fidelity signals.

15. A method, comprising:
registering, by a residential gateway device comprising a processor, a mobile phone number with the residential gateway device via a femtocell integrated with the residential gateway device when a mobile device associated with the mobile phone number is within range of the femtocell;
registering, by the residential gateway device, a voice over internet protocol phone number with the residential gateway device;
presenting, at a display device coupled to a set top box registered with the residential gateway device, a user interface providing an option to use a first service associated with the mobile phone number or a second service associated with the voice over internet protocol phone number when initiating an outgoing call or when answering an incoming call as presented options;
selectively receiving and making, by the residential gateway device, calls using one of the set top box registered with the residential gateway device, the mobile device registered with the femtocell, a voice over internet protocol phone corresponding to the voice over internet protocol phone number, or any wired phone connected to a terminal adaptor within the residential gateway device through the femtocell responsive to receiving a selection from the presented options via the user interface providing the option to use the first service associated with the mobile phone number or the second service associated with the voice over internet protocol phone number; and
generating a pause command for a digital video recorder associated with the set top box during the selectively receiving and making calls.

16. The method of claim 15, further comprising communicating with the set top box registered with the residential gateway device.

17. The method of claim 15, wherein the residential gateway device selectively configures first mobile devices that use a circuit switch network and second mobile devices that use a packet switch network.

18. The method of claim 15, wherein the residential gateway device communicates with a web portal for provisioning of network elements in communication with the residential gateway device.

19. The method of claim 15, wherein the residential gateway device selects by default a registered phone number to originate a call based on the registered phone number being located in a call log.

* * * * *